(12) United States Patent
Heidenreich et al.

(10) Patent No.: US 9,044,742 B2
(45) Date of Patent: Jun. 2, 2015

(54) METHOD FOR PRODUCING STABLE, HIGH-PURITY MOLDED BODIES FROM PYROGENIC METAL OXIDES WITHOUT THE ADDITION OF BINDERS

(75) Inventors: Roland Heidenreich, Munich (DE); Hans-Jurgen Eberle, Munich (DE); Torsten Gottschalk-Gaudig, Mehring (DE); Johann Weis, Sauerlach (DE); Joachim Pohl, Altenmarkt (DE)

(73) Assignee: Wacker Chemie AG, Munich (DE)

( * ) Notice: Subject to any disclaimer, the term of this patent is extended or adjusted under 35 U.S.C. 154(b) by 814 days.

(21) Appl. No.: 12/518,522

(22) PCT Filed: Dec. 6, 2007

(86) PCT No.: PCT/EP2007/063381
§ 371 (c)(1),
(2), (4) Date: Nov. 4, 2009

(87) PCT Pub. No.: WO2008/071611
PCT Pub. Date: Jun. 19, 2008

(65) Prior Publication Data
US 2010/0144519 A1      Jun. 10, 2010

(30) Foreign Application Priority Data
Dec. 13, 2006  (DE) .................. 10 2006 058 813

(51) Int. Cl.
| | |
|---|---|
| *C04B 35/653* | (2006.01) |
| *B01J 23/44* | (2006.01) |
| *B01J 21/04* | (2006.01) |
| *B01J 21/08* | (2006.01) |
| *B01J 23/52* | (2006.01) |
| *B01J 23/58* | (2006.01) |
| *B01J 23/60* | (2006.01) |
| *B01J 23/66* | (2006.01) |
| *B01J 37/00* | (2006.01) |
| *C04B 35/14* | (2006.01) |
| *C04B 35/16* | (2006.01) |
| *C04B 35/18* | (2006.01) |
| *C04B 35/48* | (2006.01) |
| *C04B 35/626* | (2006.01) |
| *B01J 35/10* | (2006.01) |

(52) U.S. Cl.
CPC *B01J 23/44* (2013.01); *B01J 21/04* (2013.01); *B01J 21/08* (2013.01); *B01J 23/52* (2013.01); *B01J 23/58* (2013.01); *B01J 23/60* (2013.01); *B01J 23/66* (2013.01); *B01J 37/0009* (2013.01); *B01J 37/0036* (2013.01); *C04B 35/14* (2013.01); *C04B 35/16* (2013.01); *C04B 35/18* (2013.01); *C04B 35/481* (2013.01); *C04B 35/62615* (2013.01); *C04B 35/6263* (2013.01); *B01J 35/1019* (2013.01); *B01J 35/1047* (2013.01); *C04B 2235/3217* (2013.01); *C04B 2235/3232* (2013.01); *C04B 2235/3244* (2013.01); *C04B 2235/3418* (2013.01); *C04B 2235/5409* (2013.01); *C04B 2235/6021* (2013.01); *C04B 2235/604* (2013.01); *C04B 2235/606* (2013.01); *C04B 2235/95* (2013.01)

(58) Field of Classification Search
USPC .............. 264/332, 37.19, 37.2, 636, 681–682
See application file for complete search history.

(56) References Cited

U.S. PATENT DOCUMENTS

| | | |
|---|---|---|
| 4,052,334 A | 10/1977 | Mockett |
| 4,419,115 A | 12/1983 | Johnson, Jr. et al. |
| 4,482,642 A | 11/1984 | Ettlinger et al. |
| 4,680,043 A | 7/1987 | Ginter et al. |
| 5,002,918 A | 3/1991 | Deller et al. |
| 5,021,378 A | 6/1991 | Deller et al. |
| 5,030,433 A | 7/1991 | Mehrotra |
| 5,086,031 A | 2/1992 | Deller et al. |
| 6,207,610 B1 | 3/2001 | Krause et al. |
| 6,316,383 B1 * | 11/2001 | Tacke et al. ............ 502/232 |
| 6,593,270 B1 * | 7/2003 | Krause et al. ............ 502/328 |
| 6,821,922 B1 | 11/2004 | Tacke et al. |
| 2003/0119648 A1 | 6/2003 | Werdecker et al. |
| 2004/0038811 A1 * | 2/2004 | Parmaliana et al. ....... 502/232 |
| 2006/0070915 A1 | 4/2006 | Euzen et al. |
| 2009/0280048 A1 | 11/2009 | Gottschalk-Gaudig et al. |
| 2010/0022796 A1 | 1/2010 | Heidenreich et al. |

FOREIGN PATENT DOCUMENTS

| | | |
|---|---|---|
| DE | 4142898 A1 | 6/1993 |
| DE | 4142902 A1 | 6/1993 |
| DE | 19843693 A1 | 3/2000 |
| DE | 10247314 A1 | 6/2004 |
| EP | 0072390 A2 | 2/1983 |
| EP | 0327722 A2 | 8/1989 |
| EP | 0327815 A1 | 8/1989 |
| EP | 0393356 A1 | 10/1990 |
| EP | 0807615 A1 | 11/1997 |
| EP | 1700830 * | 9/2006 |

(Continued)

OTHER PUBLICATIONS

D. Koth, H. Ferch, Chem. Ing. Techn. 52 (1980) Nr. 8, S. 628-634.

*Primary Examiner* — Stella Yi
(74) *Attorney, Agent, or Firm* — Brooks Kushman P.C.

(57) ABSTRACT

Shaped bodies with good strength properties are prepared from pyrogenic metal oxide(s) by suspending the metal oxide (s) in a liquid, milling to activate the metal oxide particles, forming an activated homogenous suspension, coagulating the suspension, and forming shaped bodies therefrom.

17 Claims, No Drawings

(56) References Cited

FOREIGN PATENT DOCUMENTS

| JP | 58-026048 | 2/1983 |
| JP | 2009-316339 A | 12/1997 |
| JP | 11-268017 A | 10/1999 |
| JP | 2006-075829 A | 3/2006 |
| WO | 2008000302 A2 | 1/2008 |
| WO | 2008071610 A2 | 6/2008 |

\* cited by examiner

METHOD FOR PRODUCING STABLE, HIGH-PURITY MOLDED BODIES FROM PYROGENIC METAL OXIDES WITHOUT THE ADDITION OF BINDERS

CROSS-REFERENCE TO RELATED APPLICATION

This application is the U.S. national phase of PCT Appln. No. PCT/EP2007/063381 filed Dec. 6, 2007 which claims priority to German application DE 10 2006 058 813.4 filed Dec. 13, 2006.

BACKGROUND OF THE INVENTION

1. Field of the Invention

The invention relates to the production of stable, high-purity moldings from pyrogenic metal oxides without addition of binders and their use.

2. Description of Related Art

Pyrogenic metal oxides are extremely finely divided and have high specific surface areas, defined, spherical primary particles having a defined surface chemistry and no internal surfaces (pores). Furthermore, they have a very high chemical purity.

In view of the properties outlined above, pyrogenic silicon dioxides, for example, are attracting increasing interest as supports for catalysts (D. Koth, H. Ferch, Chem. Ing. Techn. 52, 628 (1980)).

However, owing to the particularly finely divided nature of the pyrogenic metal oxides, the production of moldings as are used, for example, as catalysts or catalyst supports from these pyrogenic metal oxides is difficult. The production of moldings from metal oxide powders is generally carried out by pressing or extrusion using binders and lubricants in order to obtain stable moldings. The binders and lubricants are inorganic and organic additives.

Inorganic additives such as magnesium stearate remain in the form of inorganic compounds, e.g. magnesium oxide, in the molding produced. Organic additives, too, can result in impurities such as carbon in the production process for the moldings. The desired very high purity of the pyrogenic metal oxides used, e.g. pyrogenic $SiO_2$, is in this way lost in the moldings produced.

Apart from the high purity and the high surface area, it is further desired to obtain moldings having a very low bulk density. This can, firstly, have a favorable effect on mass transfer in the later catalyzed reaction, and secondly, enables a smaller mass of support material to be required in order to fill a particular reactor volume. The cost ratio of support material to reactor volume is improved in this way and the process becomes more economical.

Low bulk densities can be achieved, for example, by means of moldings which have at least one channel running through them, as in the case of, for example, rings. Ring-shaped bodies having a very low wall thickness are particularly useful. However, low wall thicknesses lead to moldings whose mechanical strengths are no longer sufficient for catalyst production and/or filling of the reactor and are therefore unsuitable as catalyst support materials.

Many possible ways of producing moldings from metal oxides are described in the prior art, but a binder is always added to achieve later strength.

EP 72390 describes the production of pressed bodies from a mixture of pyrogenic metal oxides, water, silica sol and a pressing auxiliary. A polyfunctional alcohol (e.g. glycerol) is claimed as an auxiliary.

EP 327722 discloses mixing pyrogenic silicon dioxide with kaolin and/or graphite, sugar, starch, urea, and aqueous wax in emulsion. The production of the pressed bodies can be carried out using punch presses, eccentric presses, extruders, rotary presses or compacters. An analogous procedure is used in EP 327815, but pyrogenic silicondioxide/aluminum oxide mixed oxide is used instead of pyrogenic silicon dioxide.

EP 393356 describes the production of pressed bodies from pyrogenic silicon dioxide, urea, methylcellulose and/or magnesium stearate, graphite, aluminum stearate and water.

EP 807615 describes a process for producing pressed bodies comprising pyrogenic silicon dioxide, methylcellulose, microwax and polyethylene glycol and water. The pressed bodies usually have contents of from 50 to 90% by weight of silicon dioxide, from 0.1 to 20% by weight of methylcellulose and from 0.1 to 15% by weight of microwax and from 0.1 to 15% by weight of polyethylene glycol.

DE-A-10247314 discloses moldings based on silicon dioxide and/or titanium dioxide which additionally contain glass fibers. The moldings are produced by homogenizing pulverulent silicon dioxide and/or titanium dioxide with glass fibers, methylhydroxypropylcellulose, wax emulsion or polyethylene glycol, polysaccharide and polyethylene oxide with addition of water. The resulting composition is shaped to produce extrudates.

According to DE4142898, it is possible to produce stable moldings from pyrogenic silica and aqueous-alcoholic ammonia solution. On the other hand, a purely aqueous ammonia solution does not lead to success. The high proportion of aqueous-alcoholic ammonia solution makes the mixture to be shaped strongly alkaline. The use of alcohol incurs the risk of C contamination of the resulting catalyst support. According to DE4142902, stable moldings can be obtained from pyrogenic silica and ammonia solution or from pyrogenic silica and alkali metal-containing silica sol only when the shaped bodies are subjected to hydrothermal treatment. In the case of the addition of ammonia, the mixture is again made very alkaline. It is known that this excess of base (pH >10) leads to partial dissolution of $SiO_2$.

The documents of the prior art show that the production of stable moldings has hitherto not been possible without inorganic or organic additives such as extrusion auxiliaries, pore formers, sols or additional strengthening steps. All these measures cause a not inconsiderable proportion of undesirable contamination in the product.

SUMMARY OF THE INVENTION

It is an object of the invention to improve the prior art and, in particular, to provide a process for producing moldings based on pyrogenic metal oxides, e.g. pyrogenic $SiO_2$, and also moldings which have very low contamination by metals, carbon and phosphorus and at the same time have a high strength. These and other objects are surprisingly achieved by suspending a pyrogenic metal oxide in a liquid, intensively milling the suspension to activate the metal oxide, coagulating the activated dispersion, and shaping the coagulated composition.

DETAILED DESCRIPTION OF THE PREFFERED EMBODIMENTS

The invention thus provides a process for producing moldings, characterized in that at least one pyrogenic metal oxide is suspended in a solvent, the suspension obtained is milled by means of a high-energy mill, the suspension containing the metal oxide which has been activated by the milling is then subjected to a coagulation step and the coagulated suspension is subsequently subjected to a shaping step.

The pyrogenic metal oxide powders are obtained by flame hydrolysis or flame oxidation of a metal oxide precursor in a hydrogen/oxygen flame. This initially forms approximately spherical primary particles which sinter together during the reaction to form aggregates. The aggregates can subsequently club together to form agglomerates. In contrast to the agglomerates, which are generally relatively easy to separate into the aggregates by introduction of energy, the aggregates are broken up further only by means of intensive energy input, if at all.

As pyrogenic metal oxides, it is possible to use silicon oxide ($Si_xO_y$), aluminum oxide ($Al_xO_y$), titanium oxide ($Ti_xO_y$), zirconium oxide ($Zr_xO_y$), cerium oxide ($Ce_xO_y$) or mixtures of these metal oxides. Preference is given to using silicon oxide, more preferably silicon dioxide ($SiO_2$) (WACKER HDK® T40).

To produce the suspension, pyrogenic metal oxide powder or mixtures of various metal oxide powders are slowly introduced by means of stirring energy into a liquid phase or "solvent", preferably water. To avoid premature gelling, the introduction is preferably carried out over a period of from 5 to 90 minutes.

To activate the metal oxides, they are converted into a high-energy state by milling. This milling is preferably carried out in the presence of a solvent, preferably water, which dissipates the heat produced during milling.

To produce the activated, fine suspension, it has been found to be advantageous to mill the components in a friction mill, for example an annular gap mill. In the annular gap mill, a centrally mounted milling cone rotates in a bell-shaped hollow cone. The material to be milled enters the mill from below, is comminuted in the annular gap between the milling cone and the outer wall of the housing and exits in the upper part of the mill, which is also referred to as a bell mill. The suspension obtained can be collected in a vessel and recirculated to the inlet of the mill.

As an alternative to annular gap mills, all other types of mills known to those skilled in the art for wet milling, for example an upright or horizontal stirred ball mill, can also be used. The solvent is preferably maintained at room temperature in all sections in a circuit. In addition, an internal cooling circuit can be provided in the mill for eliminating any temperature gradients which may occur.

As an alternative to presuspension of the metal oxide in the liquid and subsequent wet milling of the suspension in two separate steps, the addition of the solid (metal oxide and/or mixture of various metal oxides) to the solvent can also be carried out during wet milling. Regardless of whether the solid is introduced beforehand or is introduced into the high-energy mill during the milling step, milling is preferably carried out for a time of from 0.5 to 4 hours after addition of solid is complete.

The metal oxide suspension can be produced using milling media, for example beads made of steel, glass, aluminum oxide, zirconium oxide, zirconium silicate, silicon carbide, silicon nitride or other materials known to those skilled in the art. Preference is given to materials comprising zirconium silicate, zirconium oxide, or silicon nitride, more preferably silicon nitride. The milling bead diameters are usually from 0.8 to 2.0 millimeters.

The production of the suspension should result in a very homogeneous suspension. For the purposes of the invention, the suspension is homogeneous when it is essentially free of agglomerates. Agglomerates cause inhomogeneities in the future ceramic microstructure of the respective application, e.g. for use as a catalyst support. To ensure freedom from agglomerates, the suspensions can also be freed of remaining agglomerates by sieving after the end of the dispersing operation.

A low viscosity (e.g. <2 Pa s) and yield point is important for optimal homogenization of the suspension. These can be achieved by altering the pH. In the case of pyrogenic silicon dioxide, this can be effected by addition of an acid.

The pH is preferably kept in the range from 2.0 to 4.0, more preferably from 2.5 to 3.5, both during presuspension and during milling. This can be achieved by optimal addition of an acid or a base. As acid or base, it is possible to use all mineral or nonmineral acids or bases known to those skilled in the art which later leave no impurities or only negligible impurities in the molding. Preference is given to using hydrochloric acid or nitric acid as acid and ammonia, preferably an aqueous ammonia solution, as a base.

The solids content of the metal oxide suspension is preferably from 5 to 40% by weight, more preferably from 10 to 30% by weight and most preferably from 15 to 25% by weight, regardless of whether the metal oxide suspension has been produced in two separate steps or the metal oxide powder has been introduced only during the wet milling.

In the coagulation step, the suspension containing the activated metal oxide is converted by means of a pH change or by further addition of one or more metal oxides from its homogeneous, stable, fluid state into a state in which the suspension coagulates and begins to form a paste-like mass. The coagulated state of the suspension can be referred to as a viscoelastic solid, i.e. the storage modulus G' is many times higher than the loss modulus G".

If the coagulation to form a paste-like mass is carried out by stirring a further, pulverulent metal oxide or a mixture of various metal oxides into the suspension, this can, if appropriate, be accompanied by additional addition of a base, for example aqueous ammonia solution, to aid the gelling process.

The pH can be kept constant in the range from 2 to 4 by optional addition of an acid, for example hydrochloric acid, until the addition of further pulverulent metal oxide is completed. After the addition of the additional amount of solid has been concluded, the pH can, if appropriate, be set in the range from 4 to 10, more preferably in the range from 5 to 8, by dropwise addition of a base, for example an aqueous ammonia solution, while stirring. Alteration of the pH and/or addition of one or more metal oxides alters the rheology. A fluid suspension is converted into a gel-like molding composition. The ratio of the amount of additional pulverulent metal oxide added to the metal oxide present in the suspension is usually from 1:1 to 1 part of pulverulent metal oxide to 2 parts of metal oxide in suspension. During stirring in, care has to be taken to ensure that the metal oxide introduced is distributed very uniformly in the initial activated metal oxide suspension and inhomogeneities in the paste-like mass are avoided. Mixing the metal oxide powder into the suspension using high shear forces should be avoided, since otherwise the plasticity of the composition which is suitable for the subsequent shaping step is lost again and the composition becomes too fluid. Relatively long delay times (a number of hours to days) can restore the appropriate plastic properties required for the later shaping step to a suspension which has become too fluid.

If the mixing of the compositions is insufficient, inhomogeneities within the molding composition can influence the subsequent shaping step in an undesirable way. This results in formation of moldings having low mechanical stability or masses which are absolutely unsuitable for shaping. The solids content of metal oxide in the molding composition is, for example, from to 40% by weight in the case of support materials based on pyrogenic $SiO_2$.

If tableting is carried out as molding method, it is advantageous to choose a significantly higher solids content. If precipitated metal oxide particles are added to the pyrogenic metal oxide particles, the solids content of the dispersion can, for example in the case of precipitated silica, be increased from 40% by weight to up to 60% by weight.

As an alternative, the coagulation step can also be induced only by altering the pH. In this embodiment according to the invention, the pH of the activated suspension is increased by slow, preferably dropwise addition of an aqueous ammonia solution to a final value in the range from 4 to 10, particularly preferably from 5 to 8, resulting in gelling of the composition. To prevent fine granulation of the composition, further mixing is immediately ceased (stopping of the stirrer). The solids content of the plasticizable composition is usually from 10 to 40% by weight.

Shaping of the composition can, for example, be carried out by extrusion, tableting or pressing. The molding is preferably produced by extrusion. Here, all apparatuses known to those skilled in the art, e.g. extruders, screw extruders, tableting machines, extrusion presses, ram extruders, are conceivable. Preference is given to using a ram extruder, whose use results in no further shear forces or only small shear forces which could lead to liquefaction of the composition or phase separation of the molding composition acting on the molding composition.

The geometry of the molding is determined by the molding tool selected in each case. It is possible to produce geometries such as rings, pellets, cylinders, wagon wheels, spheres, etc. The length of rings and pellets is defined directly after shaping by use of a cutting device. Drying of the molding is carried out by means of methods known to those skilled in the art (drying oven, IR heating, microwave). Drying is carried out at temperatures in the range from 25° C. to 200° C., preferably from 30° C. to 100° C., and more preferably from 40° C. to 80° C. The drying time depends on the ratio of metal oxide to water, but is generally in the range from 0.5 to 50 hours, preferably from 2 to 30 hours.

Drying of the moldings is very critical, since if drying is too rapid (for example the temperature is too high or the atmospheric humidity is too low) the moisture still present cannot escape from the material via the pores quickly enough and cracks can therefore form in the body or the body can even disintegrate.

After drying of the molding, the latter is subjected to calcination. As a calcination process, it is possible to use all customary processes known to those skilled in the art. Preference is given to calcination in a furnace under an air atmosphere, with the oxygen content being able to be varied A further gas can be added to the air. Various protective gases are possible here. Suitable protective gases are all protective gases known to those skilled in the art, most preferably nitrogen, argon or helium. The air can likewise be replaced completely by the protective gas. Calcination is preferably carried out at temperatures in the range from 500° C to 1250° C., more preferably from 700° C. to 1100° C, and most preferably from 850° C. to 1000° C. The sintering time is in the range from 0.5 to 20 hours; a typical sintering time is in the range from 2 to 10 hours. Calcination can be carried out under atmospheric pressure or under reduced pressure. The process of the invention makes it possible to achieve the same strengths as are customary in the prior art at lower calcination temperatures.

The calcination step results in a reduction in the surface area of the catalyst support, which is an important parameter for the catalytic process. Since, however, the support materials according to the invention display satisfactory stability even without calcination or after calcination at low temperatures because of their excellent homgeneity, they have not only a higher purity but also significantly higher support surface areas and pore volumes than in the prior art.

The molding obtained from the process of the invention can generally be used in all processes or working steps known to those skilled in the art in which the properties of the molding and in particular of the porous material present in the molding is desired. The molding of the invention is most preferably used as a catalyst in chemical reactions or serves as support material which, after application of the respective active components matched to the process, gives corresponding supported catalysts.

The moldings obtained from the process of the invention are also distinguished by the fact that they are produced without the customary addition of auxiliaries/additives such as extrusion auxiliaries, pore formers or sols. The omission of auxiliaries enables the high chemical purity of the (for example pyrogenic) metal oxides to be retained. The support form of the materials is not critical for the process of the invention. Whether the active components are added to the paste-like mass before the shaping step and are therefore more or less finely dispersed in the support material straight after the shaping step or are applied only after final production of the catalyst support in a subsequent process step, e.g. by means of impregnation, is likewise not critical to the invention.

Owing to the high purity of the starting powders and the high-purity production process, targeted doping of a high-purity metal oxide with another high-purity metal oxide is possible. An example is the production of acidic catalyst supports by doping of pyrogenic $SiO_2$ with pyrogenic $Al_2O_3$. This doping creates Lewis-acid centers in the $SiO_2$. Analogously, high-purity mixed oxides can be produced from the high-purity oxides $SiO_2$, $Al_2O_3$, $ZrO_2$ and $TiO_2$.

The use according to the invention of finely divided oxides gives moldings having very high surface areas. The BET surface areas achieved are in the range from 30 $m^2/g$ to 500 $m^2/g$, preferably from 150 $m^2/g$ to 450 $m^2/g$ and more preferably from 250 $m^2/g$ to 400 $m^2/g$. The finely divided oxides also result in production of a molding having a high pore volume in the range from 0.5 ml/g to 1.8 ml/g, preferably from 0.7 ml/g to 1.5 ml/g and more preferably from 0.9 ml/g to 1.3 ml/g.

Fine-pored moldings can be formed from the finely divided metal oxides by means of sintering. The proportion of pores having a diameter in the range from 10 nm to 20 nm is typically greater than 50%, preferably greater than 60% and very particularly preferably greater than 70%.

EXAMPLES

Example 1

40 gram of pyrogenic silica (WACKER HDK® T40) are stirred into 160 gram of deionized water, circulated and milled for 2.5 hours in an annular gap mill containing zirconium silicate milling beads (diameter of the milling beads: 0.8-1.0 mm). The angular velocity during the milling step is 11 meters per second. After milling is complete, 40 gram of pulverulent pyrogenic silica (WACKER HDK® T40) is stirred into the dispersion until a paste-like gel-like mass is formed. This composition is extruded in a ram extruder through a suitable die to give the desired shapes and optionally cut to the desired length of the molding. The moldings obtained, in this case rings having a length of 6 mm, an external diameter of 6 mm and a hole of 3 mm, are dried at a temperature of 85° C. and an atmospheric humidity of 75% for 24 hours and subsequently calcined at 650° C. for a time of 1.5 hours. The ring-shaped support bodies according to the invention have a surface area (BET surface area) of 370 m$^2$/g and a pore volume of 1.1 ml/g. The mechanical strength of the rings in the transverse direction is 10 N.

Example 2

20 gram of pyrogenic silica (WACKER HDK® T40) are stirred into 180 gram of deionized water, circulated and milled for 2.5 hours in an annular gap mill containing glass milling beads (diameter of the milling beads: 2.0 mm). The angular velocity during the milling step is 11 meters per second. After milling is complete, 20 gram of pulverulent pyrogenic silica (WACKER HDK® T40) is stirred into the dispersion until a paste-like gel-like mass is formed. This composition is extruded in a ram extruder through a suitable die to give the desired shapes and optionally cut to the desired length of the molding. The moldings obtained, in this case rings having a length of 6 mm, an external diameter of 6 mm and a hole of 3 mm, are dried at a temperature of 85° C. and an atmospheric humidity of 75% for 24 hours and subsequently calcined at 550° C. for a time of 1.5 hours. The ring-shaped support bodies according to the invention have a surface area (BET surface area) of 280 m$^2$/g and a pore volume of 1.1 ml/g. The mechanical strength of the rings in the transverse direction is 9 N.

Example 3

35 gram of pyrogenic silica (WACKER HDK® T40) are stirred into 160 gram of deionized water, circulated and milled for 2.5 hours in an annular gap mill containing cerium-stabilized zirconium oxide milling beads (diameter of the milling beads: 0.8 mm). The angular velocity during the milling step is 11 meters per second. After milling is complete, 33 gram of pulverulent pyrogenic silica (WACKER HDK® T40) is stirred into the dispersion until a paste-like gel-like mass is formed. This composition is extruded in a ram extruder through a suitable die to give the desired shapes and optionally cut to the desired length of the molding. The moldings obtained, in this case rings having a length of 6 mm, an external diameter of 6 mm and a hole of 3 mm, are dried at a temperature of 85° C. and an atmospheric humidity of 75% for 24 hours and subsequently calcined at 650° C. for a time of 1.5 hours. The ring-shaped support bodies according to the invention have a surface area (BET surface area) of 360 m$^2$/g and a pore volume of 1.3 ml/g. The mechanical strength of the rings in the transverse direction is 10 N.

Example 4

Support material production analogous to example 3, but the moldings are dried for 6 hours at a temperature of 95° C. and an atmospheric humidity of 65% and subsequently calcined at 950° C. for a time of 2 hours. The ring-shaped support bodies according to the invention have a surface area (BET surface area) of 310 m$^2$/g and a pore volume of 1.0 ml/g. The mechanical strength of the rings in the transverse direction is 19 N.

Example 5

Support material production analogous to example 3, but the moldings are dried for 10 hours at a temperature of 75° C. and an atmospheric humidity of 75% and subsequently calcined at 1050° C. for a time of 5 hours. The ring-shaped support bodies according to the invention have a surface area (BET surface area) of 170 m$^2$/g and a pore volume of 0.9 ml/g. The mechanical strength of the rings in the transverse direction is 20 N.

Example 6

40 gram of pyrogenic silica (WACKER HDK® T40) are stirred into 160 gram of deionized water, circulated and milled for 2.5 hours in an annular gap mill containing yttrium-stabilized zirconium oxide milling beads (diameter of the milling beads: 0.8 mm). The angular velocity during the milling step is 11 meters per second. After milling is complete, 40 gram of pulverulent pyrogenic silica (WACKER HDK® T40) is stirred into the dispersion until a paste-like gel-like mass is formed. This composition is extruded in a ram extruder through a suitable die to give the desired shapes and optionally cut to the desired length of the molding. The moldings obtained, in this case rings having a length of 6 mm, an external diameter of 6 mm and a hole of 3 mm, are dried at a temperature of 85° C. and an atmospheric humidity of 75% for 24 hours and subsequently calcined at 650° C. for a time of 1.5 hours. The ring-shaped support bodies according to the invention have a surface area (BET surface area) of 350 m$^2$/g and a pore volume of 1.3 ml/g. The mechanical strength of the rings in the transverse direction is 8 N.

Example 7

Support material production analogous to example 6, but the moldings are calcined at 950° C. for a time of 8 hours. The ring-shaped support bodies according to the invention have a surface area (BET surface area) of 300 m$^2$/g and a pore volume of 1.1 ml/g. The mechanical strength of the rings in the transverse direction is 19 N.

Example 8

Support material production analogous to example 6, but the moldings are calcined at 900° C. for a time of 2 hours. The ring-shaped support bodies according to the invention have a surface area (BET surface area) of 320 m$^2$/g and a pore volume of 1.2 ml/g. The mechanical strength of the rings in the transverse direction is 13 N.

Example 9

36 gram of pyrogenic silica (WACKER HDK® T40) are stirred into 164 gram of deionized water, circulated and milled for 2.5 hours in an annular gap mill containing aluminum oxide milling beads (diameter of the milling beads: 2.0 mm). The angular velocity during the milling step is 11 meters per second. After milling is complete, 32 gram of pulverulent pyrogenic silica (WACKER HDK® T40) is stirred into the dispersion until a paste-like gel-like mass is formed. This composition is extruded in a ram extruder through a suitable die to give the desired shapes and optionally cut to the desired length of the molding. The moldings obtained, in this case rings having a length of 6 mm, an external diameter of 6 mm and a hole of 3 mm, are dried at a temperature of 85° C. and an atmospheric humidity of 70% for 12 hours and subsequently calcined at 650° C. for a time of 1.5 hours. The ring-shaped support bodies according to the invention have a surface area (BET surface area) of 350 m$^2$/g and a pore volume of 1.2 ml/g. The mechanical strength of the rings in the transverse direction is 9 N.

Example 10

36 gram of pyrogenic silica (WACKER HDK® T40) are stirred into 164 gram of deionized water, circulated and milled for 2.5 hours in an annular gap mill containing silicon nitride milling beads (diameter of the milling beads: 2.0 mm). The angular velocity during the milling step is 11 meters per second. After milling is complete, 34 gram of pulverulent pyrogenic silica (WACKER HDK® T40) is stirred into the dispersion until a paste-like gel-like mass is formed. This composition is extruded in a ram extruder through a suitable die to give the desired shapes and optionally cut to the desired length of the molding. The moldings obtained, in this case rings having a length of 6 mm, an external diameter of 6 mm and a hole of 3 mm, are dried at a temperature of 85° C. and an atmospheric humidity of 80% for 24 hours and subsequently calcined at 650° C. for a time of 1.5 hours. The ring-shaped support bodies according to the invention have a surface area (BET surface area) of 330 m$^2$/g and a pore volume of 1.2 ml/g. The mechanical strength of the rings in the transverse direction is 18 N.

Example 11

Support material production analogous to example 10, but the moldings are calcined at 950° C. for a time of 2 hours. The ring-shaped support bodies according to the invention have a surface area (BET surface area) of 310 m$^2$/g and a pore volume of 1.1 ml/g. The mechanical strength of the rings in the transverse direction is 22 N.

Example 12

Support material production analogous to example 10, but the moldings are calcined at 900° C. for a time of 8 hours. The ring-shaped support bodies according to the invention have a surface area (BET surface area) of 320 m$^2$/g and a pore volume of 1.2 ml/g. The mechanical strength of the rings in the transverse direction is 25 N.

Example 13

Support material production analogous to example 10, but the moldings are calcined at 1100° C. for a time of 8 hours. The ring-shaped support bodies according to the invention have a surface area (BET surface area) of 120 m$^2$/g and a pore volume of 0.6 ml/g. The mechanical strength of the rings in the transverse direction is 60 N.

Example 14

10 kilogram of pyrogenic silica (WACKER HDK® T40) are stirred into 40 kilogram of deionized water, circulated and milled for 2 hours in a stirred ball mill containing silicon nitride milling beads (diameter of the milling beads: 2.0 mm, degree of fill: 70% by volume). The angular velocity during the milling step is 11 meters per second. After milling is complete, 5 kilogram of pulverulent pyrogenic silica (WACKER HDK® T40) is stirred into the dispersion until a paste-like gel-like mass is formed. This composition is extruded in a ram extruder through a suitable die to give the desired shapes and optionally cut to the desired length of the molding. The moldings obtained, in this case rings having a length of 5.5 mm, an external diameter of 5.5 mm and a hole of 3 mm, are dried at a temperature of 85° C. and an atmospheric humidity of 75% for 24 hours and subsequently calcined at 650° C. for a time of 1.5 hours. The ring-shaped support bodies according to the invention have a surface area (BET surface area) of 360 m$^2$/g and a pore volume of 1.3 ml/g. The mechanical strength of the rings in the transverse direction is 6 N. The bulk density is 270 gram per liter.

Example 15

Support material production analogous to example 14, but the moldings have a length of 5.5 millimeters, an external diameter of 5.5 millimeters and a hole of 2.5 millimeters. The moldings are calcined at 900° C. for a time of 8 hours. The ring-shaped support bodies according to the invention have a surface area (BET surface area) of 290 m$^2$/g and a pore volume of 1.2 ml/g. The mechanical strength of the rings in the transverse direction is 10 N. The bulk density is 320 gram per liter.

Example 16

36 gram of pyrogenic silica (WACKER HDK® T40) are stirred into 164 gram of deionized water, circulated and milled for 2.5 hours in an annular gap mill containing silicon nitride milling beads (diameter of the milling beads: 2.0 mm, degree of fill: 70% by volume). The angular velocity during the milling step is 11 meters per second. After milling is complete, 20 gram of pulverulent pyrogenic titanium dioxide having a surface area (BET surface area) of 50 m$^2$/g is stirred into the dispersion until a paste-like gel-like mass is formed. This composition is extruded in a ram extruder through a suitable die to give the desired shapes and optionally cut to the desired length of the molding. The moldings obtained, in this case rings having a length of 6 mm, an external diameter of 6 mm and a hole of 3 mm, are dried at a temperature of 85° C. and an atmospheric humidity of 70% for 24 hours and subsequently calcined at 650° C. for a time of 1.5 hours. The ring-shaped support bodies according to the invention have a surface area (BET surface area) of 250 m$^2$/g.

Example 17

36 gram of pyrogenic silica (WACKER HDK® T40) are stirred into 164 gram of deionized water, circulated and milled for 2.5 hours in an annular gap mill containing silicon nitride milling beads (diameter of the milling beads: 2.0 mm, degree of fill: 70% by volume). The angular velocity during the milling step is 11 meters per second. After milling is complete, 25 gram of pulverulent pyrogenic titanium dioxide having a surface area (BET surface area) of 50 m$^2$/g is stirred into the dispersion until a paste-like gel-like mass is formed. This composition is extruded in a ram extruder through a suitable die to give the desired shapes and optionally cut to the desired length of the molding. The moldings obtained, in this case rings having a length of 6 mm, an external diameter of 6 mm and a hole of 3 mm, are dried at a temperature of 85° C. and an atmospheric humidity of 75% for 24 hours and subsequently calcined at 650° C. for a time of 1.5 hours. The ring-shaped support bodies according to the invention have a surface area (BET surface area) of 180 m$^2$/g.

Example 18

36 gram of pyrogenic silica (WACKER HDK® T40) are stirred into 164 gram of deionized water, circulated and milled for 2.5 hours in an annular gap mill containing silicon nitride milling beads (diameter of the milling beads: 2.0 mm, degree of fill: 70% by volume). The angular velocity during the milling step is 11 meters per second. After milling is complete, 10 gram of pulverulent pyrogenic zirconium dioxide having a surface area (BET surface area) of 60 m²/g is stirred into the dispersion until a paste-like gel-like mass is formed. This composition is extruded in a ram extruder through a suitable die to give the desired shapes and optionally cut to the desired length of the molding. The moldings obtained, in this case rings having a length of 6 mm, an external diameter of 6 mm and a hole of 3 mm, are dried at a temperature of 85° C. and an atmospheric humidity of 75% for 24 hours and subsequently calcined at 650° C. for a time of 1.5 hours. The ring-shaped support bodies according to the invention have a surface area (BET surface area) of 300 m²/g.

Example 19

36 gram of pyrogenic aluminum oxide having a surface area (BET surface area) of 100 m²/g are stirred into 164 gram of deionized water, circulated and milled for 2.5 hours in an annular gap mill containing silicon nitride milling beads (diameter of the milling beads: 2.0 mm, degree of fill: 70% by volume). The angular velocity during the milling step is 11 meters per second. After milling is complete, 12 gram of pulverulent pyrogenic zirconium dioxide having a surface area (BET surface area) of 60 m²/g is stirred into the dispersion until a paste-like gel-like mass is formed. This composition is extruded in a ram extruder through a suitable die to give the desired shapes and optionally cut to the desired length of the molding. The moldings obtained, in this case rings having a length of 6 mm, an external diameter of 6 mm and a hole of 3 mm, are dried at a temperature of 85° C. and an atmospheric humidity of 75% for 24 hours and subsequently calcined at 650° C. for a time of 1.5 hours. The ring-shaped support bodies according to the invention have a surface area (BET surface area) of 85 m²/g.

Example 20

30 gram of pyrogenic silica (WACKER HDK® T40) and 5 gram of pyrogenic titanium dioxide having a surface area of 50 m²/g are stirred into 164 gram of deionized water, circulated and milled for 2.5 hours in an annular gap mill containing silicon nitride milling beads (diameter of the milling beads: 2.0 mm, degree of fill: 70% by volume). The angular velocity during the milling step is 11 meters per second. After milling is complete, gram of pulverulent pyrogenic titanium dioxide having a surface area (BET surface area) of 50 m²/g and 15 gram of pyrogenic silica (WACKER HDK® T40) is stirred into the dispersion until a paste-like gel-like mass is formed. This composition is extruded in a ram extruder through a suitable die to give the desired shapes and optionally cut to the desired length of the molding. The moldings obtained, in this case rings having a length of 6 mm, an external diameter of 6 mm and a hole of 3 mm, are dried at a temperature of 85° C. and an atmospheric humidity of 75% for 24 hours and subsequently calcined at 650° C. for a time of 1.5 hours. The ring-shaped support bodies according to the invention have a surface area (BET surface area) of 320 m²/g.

Example 21

(Coagulation by Means of a pH Change)

4 kilogram of pyrogenic silica (WACKER HDK® T40) are stirred into 35 kilogram of deionized water. A pH of 2.8 is set and kept constant by addition of hydrochloric acid. While stirring continually, a further 4.5 kilogram of pyrogenic silica (WACKER HDK®T40) is stirred in. After addition of the metal oxide powder is complete, the mixture is homogenized for a further 10 minutes before the suspension is milled for 45 minutes in a stirred ball mill containing silicon nitride milling beads (diameter of the milling beads: 2.0 mm, degree of fill: 70% by volume), while keeping the pH constant at a pH of 2.8 by addition of further hydrochloric acid. The angular velocity during the milling step is 11 meters per second. After milling is complete, an aqueous ammonia solution is added to the suspension while stirring continuously until a pH of 6.2 is obtained and gelling of the mass occurs at this point. The composition obtained is extruded in a ram extruder through a suitable die to give the desired shapes and optionally cut to the desired length of the molding. The moldings obtained, in this case rings having a length of 5.5 mm, an external diameter of 5.5 mm and a hole of 2.5 mm, are dried at a temperature of 85° C. and an atmospheric humidity of 75% for 8 hours and subsequently calcined at 650° C. for a time of 3 hours. The ring-shaped support bodies according to the invention have a surface area (BET surface area) of 270 m²/g and a pore volume of 1.2 ml/g. The mechanical strength of the rings in the transverse direction is 10 N.

The invention claimed is:

1. A process for producing moldings, comprising optionally presuspending a pyrogenic metal oxide in a liquid to form a suspension, milling a suspension of pyrogenic metal oxide in liquid by means of a high-energy mill to form an activated pyrogenic metal oxide suspension wherein the suspension is milled for a time of from 0.5 to 4 hours, coagulating the activated pyrogenic metal oxide suspension, and shaping the coagulated pyrogenic metal oxide suspension thereby obtained to prepare an uncalcined molding, the uncalcined molding being free of binders, wherein the pyrogenic metal oxide consists of silica.

2. The process of claim 1, wherein water is the liquid.

3. The process of claim 1, wherein the liquid is circulated through the high energy mill and heat is removed from the liquid external to the high energy mill, while the liquid is still in the high energy mill.

4. The process of claim 1, wherein milling is carried out in a friction mill, an annular gap mill or a stirred ball mill.

5. The process of claim 1, wherein the presuspending of the silica in the liquid is omitted and the silica is added to the liquid during wet milling.

6. The process of claim 1, wherein the step of milling takes place in a mill containing milling media selected from the group consisting of beads made of steel, glass, aluminum oxide, zirconium oxide, zirconium silicate, silicon carbide, silicon nitride, and mixtures thereof.

7. The process of claim 1, wherein the pH during presuspension and also during milling is in the range from 2.0 to 4.0.

8. The process of claim 7, wherein the pH is regulated by means of hydrochloric acid, nitric acid, ammonia or an aqueous solution thereof.

9. The process of claim 1, wherein the solids content of the silica suspension is from 5 to 40% by weight.

10. The process of claim 1, wherein coagulating the suspension is carried out by one or more of increasing the pH of the suspension and further addition of silica.

11. The process of claim 1, wherein coagulating the suspension containing the activated silica is carried out by increasing the pH of the suspension to a value in the range of from 4 to 10.

12. The process of claim 1, wherein coagulating the suspension containing the activated silica is carried out by further addition of silica.

13. The process of claim 12, wherein the ratio of the amount of silica additionally added to the silica present in the suspension is from 1:1 to 1:2.

14. The process of claim 10, wherein altering the pH and/or the addition of further silica effects a change in the rheology of the activated suspension.

15. The process of claim 1, wherein shaping is carried out by means of one or more of extrusion, tableting and pressing.

16. The process of claim 1, wherein a molding obtained is dried at a temperature in the range from 25° C. to 200° C. to dry the uncalcined molding.

17. The process of claim 1, further comprising calcining the molding.

* * * * *